United States Patent [19]

Scarlata

[11] 4,355,627
[45] Oct. 26, 1982

[54] THERMAL STORAGE SYSTEM

[76] Inventor: Robert W. Scarlata, 913 Heritage Rd., Moorestown, N.J. 08057

[21] Appl. No.: 154,575

[22] Filed: May 29, 1980

Related U.S. Application Data

[63] Continuation-in-part of Ser. No. 912,961, Jun. 6, 1978, Pat. No. 4,205,656.

[51] Int. Cl.³ ............................ F24H 7/00; F24J 3/02
[52] U.S. Cl. .................................. 126/400; 126/427; 126/436; 126/437
[58] Field of Search ............... 126/400, 263, 204, 436, 126/437, 430, 427; 165/18, DIG. 4, 133, 4, 7, 10

[56] References Cited

U.S. PATENT DOCUMENTS

| 608,755 | 8/1898 | Cottle | 126/400 |
|---|---|---|---|
| 965,391 | 7/1910 | Little | 126/400 |
| 2,388,940 | 11/1945 | Taylor | 126/400 |
| 2,856,506 | 10/1958 | Telkes | 126/400 |
| 3,029,806 | 4/1962 | Okuda | 126/400 |
| 3,154,141 | 10/1964 | Huet | 165/133 |
| 3,356,828 | 12/1967 | Furness | 126/400 |
| 3,369,541 | 2/1968 | Thomason | 126/400 |
| 3,464,486 | 9/1969 | Rice et al. | 126/400 |
| 3,513,828 | 5/1970 | Masters | 126/400 |
| 3,653,942 | 4/1972 | Boebel et al. | 165/133 |
| 3,773,031 | 11/1973 | Laing et al. | 126/400 |
| 3,968,786 | 7/1976 | Spielberg | 165/133 |
| 4,111,185 | 9/1978 | Swann | 126/400 |
| 4,114,600 | 9/1978 | Newton | 126/400 |
| 4,121,563 | 10/1978 | Gold | 126/400 |
| 4,127,161 | 11/1978 | Cylne et al. | 126/400 |

*Primary Examiner*—Daniel J. O'Connor
*Attorney, Agent, or Firm*—Kyle W. Rost

[57] ABSTRACT

A thermal storage system for use with a solar collector and/or heat pump includes a plurality of discrete heat reservoirs having regular geometric shapes such as spheres or cylinders for forming a self-sorting array of the reservoirs when stacked in a storage bin. Each reservoir has a shell formed of heat conductive material defining an interior cavity that contains a material of high specific heat for storing heat in the reservoir. A preferred material for economy for reservoir shells in spherelike shapes is plastic with heat conductivity enhancers such as glass or metal particles incorporated into the plastic.

10 Claims, 11 Drawing Figures

U.S. Patent  Oct. 26, 1982  Sheet 1 of 2  4,355,627
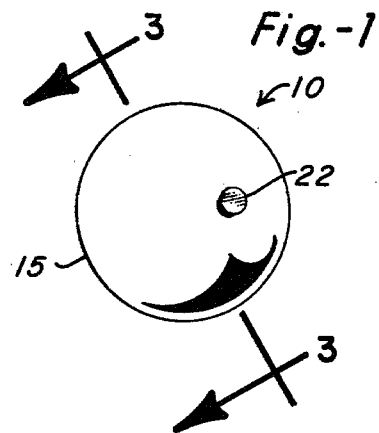
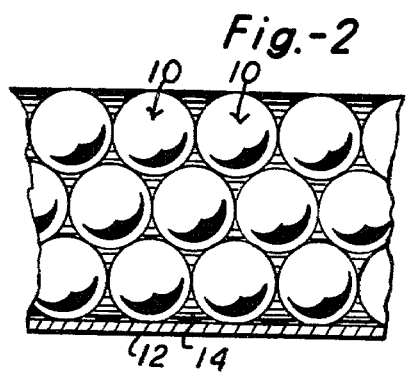
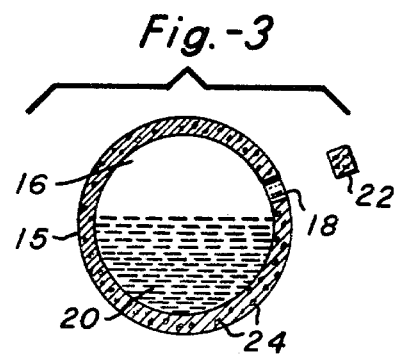
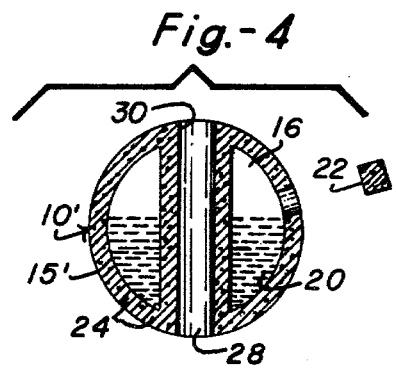
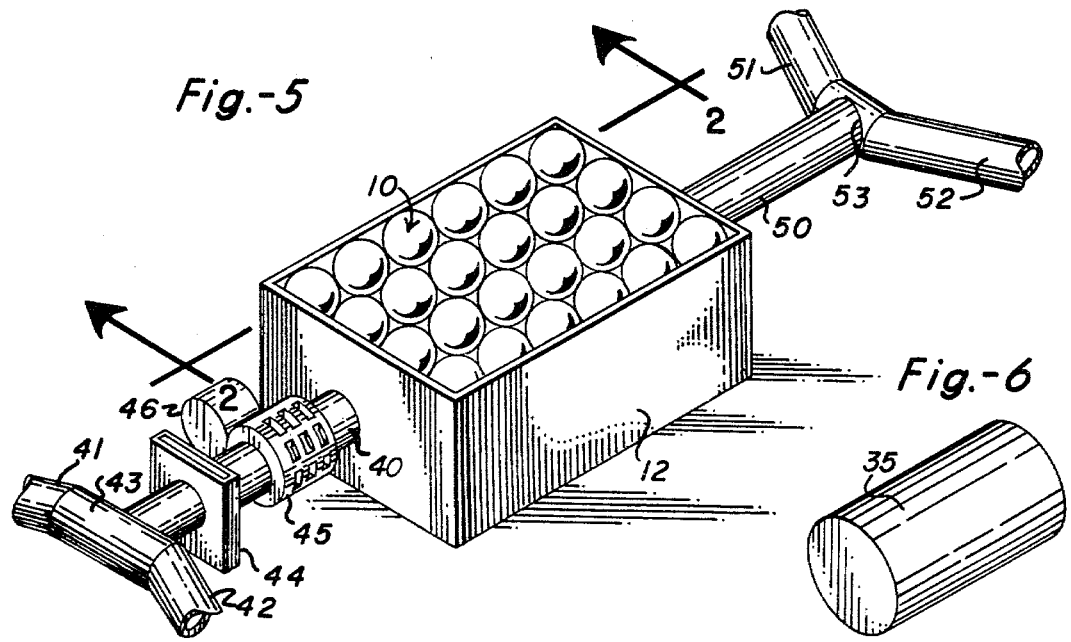

THERMAL STORAGE SYSTEM

CROSS-REFERENCE TO RELATED APPLICATION

This is a continuation-in-part of previous patent application Ser. No. 912,961, filed June 6, 1978, now U.S. Pat. No. 4,205,656.

BACKGROUND OF THE INVENTION

1. Field of the Invention

The invention relates generally to stoves and furnaces, and specifically to solar heat storage. A heat storage reservoir for use in solar heating apparatus or heat pumps is disclosed.

2. Description of the Prior Art

Solar heat collection is well known and may be accomplished by a wide variety of solar collectors that circulate hot air, hot water, and like fluids. Once the collector has heated the fluid, a long standing problem has been to adequately store the heat for later extraction and use. One of the oldest known storage techniques is to direct the heat energy or the heated fluid into a container of stones within an insulated room, as taught in U.S. Pat. No. 608,755 to Cottle. Similar teaching appears in U.S. Pat. No. 965,391 to Little, and U.S. Pat. No. 3,369,541 to Thomason. Stones, rocks, concrete blocks, bricks, and the like are well suited to receive heat over a prolonged period, such as the daylight hours of the day when sunlight can be converted to heat, and then radiate the heat for a further prolonged period, such as the night hours of the day.

In addition to stones, liquids are known as a heat storage media. In the above mentioned patent to Thomason, a central water tank is the primary heat exchanger for a heating system, and a surrounding bed of stones may exchange heat with the water tank. In other art such as U.S. Pat. No. 2,388,940 to Taylor and U.S. Pat. No. 3,029,806 to Okuda, special tanks and bag-like containers are used to store solar heated water. Liquids often have higher specific heat than rocks, and water conducts heat more rapidly than rocks, but solid heat storage media is often more feasible. Note: Water conducts heat much faster than stones. For example, water cannot effectively store heat at a temperature above boiling. Often a water storage system requires a heat exchanger in the liquid to bring air to a directly useable temperature for heating purposes. A rock bed provides heat storage and air-heating capability without an added heat exchanger.

Rock bed storage has a number of problems, one of the most serious being that air flow through a rock bed is not predictable because of the random shapes of the rocks. If air flow is too restricted through a rock bed, it is necessary to remove and reinstall the rock pile with air channels. Further drawbacks of rock storage include the labor and expense of moving rock piles and washing rock piles. Even after a rock bed storage system is properly in place, the rocks remain a source of dirt and dust and are capable of growing bacteria and fungus. While the life of a rock bed is quite long, certain types of rock bed have been reported to break up occasionally.

The invention maintains the many advantages inherent in rock bed heat storage media and overcomes all of the problems listed above. Further advantages will be evident from the description below.

SUMMARY OF THE INVENTION

A thermal storage system for use with a solar collector or heat pump employs a plurality of like-shaped containers for holding heat storage media. The containers are preferably spheres, although any number of similar shapes may be employed. The containers are stacked in a storage bin, preferably directly in contact with one-another, and a fluid heated by the solar collector is directed into the bin through an appropriate plenum. Each container may have an internal cavity that contains heat storage media such as water or phase change media. The shell of the container may be plastic with heat conductivity enhancers incorporated into the shell. The heated fluid from the solar collector readily transmits its energy through the shell and to the storage media because of the predictable fluid flow and good air turbulence through the stack of containers. At a subsequent time, the same characteristics of the thermal storage system benefit the extraction of energy from the storage media when the same or a different fluid at a lower temperature than the storage is passed through the bin for circulation to a using facility. The sphere-like containers may have a diametric central passageway for increasing heat transfer and providing improved evenness of heat transfer to the contained heat transfer material. The passageway also serves as the potential recipient of a secondary heat distributing and organizing means for supplementing a primary energy source and arranging the sphere-like reservoirs in any desired pattern, such as in columns or rows. Such means may include an elongated member that is either solid, such as a solid rod or electric heating element, or hollow, such as a hollow pipe or tube capable of conducting a fluid.

The object of the invention is to create an improved thermal storage system adapted for use with solar energy collectors and heat pumps. The invention recognizes that solar energy development requires both technological and economic analysis, and therefore offers a storage system that is superior in operational characteristics while maintaining a competitive cost position as compared to known rock storage systems.

Another object of the invention is to maximize total storage capacity, maximize combined surface area of the storage materials, minimize air flow restrictions, and maximize storage efficiency. This goal is preferably accomplished by placing water or a phase change material inside a plurality of sphere shaped storage containers and stacking the containers in direct contact within a storage bin connected to a solar collector.

A further object of the invention is to adapt inexpensive synthetic materials for use as containers and heat exchangers for heat storage media. Most plastic materials are poor heat exchangers and are ill suited to serve as heat reservoirs in an energy storage system. However, plastic containers with heat conductivity enhancers incorporated into their walls make the manufacture and use of uniformly contoured containers both technologically and economically practical. Also, less storage volume is required for equivalent heat flow, as compared to containers constructed of pure plastic.

BRIEF DESCRIPTION OF THE DRAWINGS

FIG. 1 is an isometric view of a sphere-shaped containers for heat storage media.

FIG. 2 is a cross-sectional view taken along the plane 2—2 of FIG. 5.

FIG. 3 is a cross-sectional view of the sphere of FIG. 1 taken along the plane of line 3—3 of FIG. 1.

FIG. 4 is a view similar to FIG. 3, showing a modified embodiment of the invention.

FIG. 5 is an isometric view of a storage bin containing a plurality of the sphere-shaped containers with the top wall of the bin removed for clarity.

FIG. 6 is an isometric view of a cylindrical shaped container for heat storage media.

DESCRIPTION OF THE PREFERRED EMBODIMENT

Figure 7:
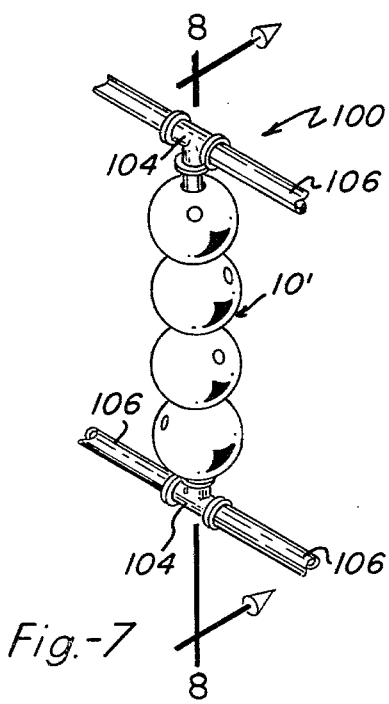
FIG. 7 is a perspective view of a plurality of reservoirs on a carrying member.

The thermal storage system contemplates the use of a plurality of discrete heat reservoirs 10 used in combination. Each heat reservoir preferably has a regular geometric shape, with the shape and size of all of the reservoirs preferably being identical or reasonably similar. FIG. 1 illustrates the preferred form of a single heat reservoir to be a sphere, although it should be understood that other shapes may be used. A sphere is the ideal shape of the reservoir, producing the freest air flow pattern through a stack of the reservoirs while providing good fluid (air) turbulence necessary for rapid heat exchange between fluid and sphere, but other regular geometric shapes such as ellipsoids, pyramids, blocks, tetrahedrons, octahedrons, etc. could be employed in the invention. The term "sphere-like" will be hereafter employed to refer to regular geometric shapes that may vary from the form of a sphere in minor ways. For example, a regular dodecahedron and all regular shapes having a greater number of faces have sphere-like properties, as do ellipsoids, while a cube may be said to have no relevant sphere-like properties for the purposes of this disclosure, as a stack of cubes potentially has no air flow between the individual cubes.

As shown in FIGS. 2 and 5, a plurality of heat reservoirs is placed in a storage bin 12, and the reservoirs form a stacked pattern with predictable number and size of void areas or interstices 14, resulting in predictable air flow characteristics through the stack of reservoirs in the bin. Where the heat reservoirs are in the shape of spheres and are closely packed in the stack, approximately two-thirds (ideally 60%) of the volume of bin 12 will be occupied by the spheres and one-third (ideally 40%) will be occupied by the interstices.

The bin 12 may be a room or a special container suited to receive the heat reservoirs 10 packed in a random stack. The bin plus its contained reservoirs may be defined as the thermal storage system. Any number of types of solar heating apparatus may be employed in conjunction with the thermal storage system, some of which produce hot air while others produce hot water or related liquids. Depending on the nature of the solar heating apparatus and the temperature envelope in which it operates, the heat reservoirs should withstand temperatures from −100° F. to +300° F. for severe conditions, although a temperature range between 0° F. and 200° F. would be adequate for most applications with low and medium temperature solar hot air collectors used for heating and cooling, as well as for heat pumps.

Each heat reservoir is desired to retain heat well while having good surface conductivity. For this purpose, each reservoir 10 has an outer shell 15 defining an interior cavity 16, best shown in FIGS. 3 and 4. An aperture 18 in the wall of the shell 15 allows heat storage media 20 to be placed in the sphere, preferably filling cavity 16 or leaving a small air space, preferably 10% of cavity 16, for expansion purposes. Suitable sealing means such as plug 22 or a screw may close the aperture 18. Appropriate permanent sealants may be applied to the plug 22 to bond it in place. Preferably, the plug is plastic and is applied and sealed in one operation with a hot iron.

The shell 15 may be constructed from known materials having high surface heat conductivity, such as aluminum or copper. However, those materials present obstacles because of their high cost. The efficiency and low cost of solar heating systems are promoted if a thermal storage system can be created without the extensive use of high cost metals, as might make the cost of the thermal storage system prohibitive. Plastic materials and like synthetic materials offer a more cost effective alternative for shell construction and, in addition, are easily sealed to prevent vapor from escaping, are non-permeable and thus uneffected by water and many high specific heat substances, do not support bacteria growth, and are non-corrosive.

Although plastics offer a number of advantages as a compositional material for shell 15, plastics as a group do not conduct heat as well as metals, especially aluminum and copper. As one of the objects of the invention is to create a heat reservoir that has good heat conductivity at its surface plus good heat retention at its interior, plastics would appear to be a less than ideal compositional material. However, it is known that some plastics conduct heat better than others. The relative rates of heat conduction of three common plastics are reported below at Table I.

TABLE I

| THERMAL CONDUCTIVITY OF SELECTED PLASTICS (BTU-in/ft$^2$/hr/°F.) | | |
|---|---|---|
| All of these are unfilled | Phenolics | 3.3 |
| | Vinyls | .7 |
| | Polystyrene | .3–.8 |

From this table, it is evident that phenolics conduct heat eleven times better than polystyrene, suggesting that phenolics would be preferred as a shell material among the materials tested in Table I. Nevertheless, it has been found that thermal conductivity of the plastic shell can be improved by the addition of heat conductivity enhancers 24 to the shell. From 30% to 50% glass or metal particles by volume is preferred to enhance heat conductivity of the plastic. Further heat conductivity enhancement is achieved when the surface of shell 15 is roughly textured. The texturing is aided by a high percentage of powdered metal or glass fibers in the plastic.

The substance 20 placed within the cavity 16 of shell 15 is a heat storage media that receives heat conducted through the material of shell 15. Water or water and ethylene glycol mixtures are suitable. Phase change materials have also been used for retaining heat in thermal storage systems. The following table reports relevant qualities for some known phase change materials.

TABLE II

| Salt Hydrate | Melting point °F. | Heat of fusion btu/lb. |
| --- | --- | --- |
| 1. Calcium chloride hexahydrate | 84–102 | 75 |
| 2. Sodium carbonate decahydrate | 90–97 | 106 |
| 3. Disodium phosphate dodecahydrate | 97 | 114 |
| 4. Calcium nitrate tetrahydrate | 103–109 | 60 |
| 5. Sodium sulfate decahydrate | 88–90 | 108 |
| 6. Sodium thiosulfate pentahydrate | 118–120 | 90 |

Some of these materials have been experimentally used in recycling tests and sodium sulfate decahydrate, known as Glauber's salt, is known in the art to perform well after repeated heating and cooling. Paraffins are also suitable as heat storage media but are too costly for wide scale use. A crystallization catalyst (nucleating agent) such as borax in small quantities is known to be a useful addition to Glauber's salt to prevent supercooling.

The reservoirs 10 may assume a number of shapes that preserve the essential advantages of the sphere shape. Referring to FIG. 4, the reservoir 10' has a modified shell 15' with a diametric passageway 28 traversing the interior cavity 16. Tubular wall 30 forms a boundry between the passageway 28 and the cavity 16. The added passageway increases the relative surface area of the heat reservoir with respect to the volume of cavity 16, and the passageway also increases the turbulence of the air or other fluid being passed through a stack of the reservoirs. The passageways provides another surprising advantage by aiding in removing heat when the phase change material in the sphere crystalizes. Crystalization begins around the edge of the sphere and the crystals act as insulators. The passageway allows additional heat to be easily removed from the liquid center of the phase change material.

The addition of passageways 28 is particularly important to the efficiency of heat conductivity and storage in the reservoirs. It is known that heat transfer from a solar heated fluid to the reservoirs is improved as the relative surface area of the reservoirs increases with respect to volume. As the reservoirs are made smaller, the surface area increases with respect to volume, but a practical limit on the smallness of the spheres is achieved when the volume of cavity 16 holds too little phase change material for adequate long term heat retention. The ideal size of a spherical reservoir has been found to be smaller than four inches in diameter with a size between one and three inches being preferred. The optimum size is approximately 2¼ inches. Sizes greater than four inches result in loss of heat conductivity efficiency and require an increase in the size of storage bin 12, while sizes smaller than one-half inch result in a loss of heat storage capacity and also require an increase in the size of bin 12. The addition of passageways through the reservoirs allows the conductivity of each reservoir to be increased disproportionately to the resultant loss of cavity volume, allowing fewer larger reservoirs to be used with performance characteristics equivalent to the use of a greater number of smaller reservoirs. The preferred passageway diameter is ¼ inch.

The spherical shape is a preferred regular geometric shape because, among other reasons, the reservoirs can be randomly stacked into a self-sorting array of extremely predictable pattern and, consequently, air flow characteristics. Nevertheless, certain practical considerations favor other shapes. In particular, it is difficult to produce great numbers of high quality sealed spheres with a liquid contained therein. Therefore, for many applications the preferred shape of the reservoirs may be that of a cylinder 35, FIG. 6, which preserves many of the advantages of the spherical shape because the cross-section of a cylinder taken normal to its axis is identical to the cross-section of a sphere taken through its center. Accordingly, a stack of identical cylinders with parallel axis will also have good air flow characteristics, although greater care will be required to place the cylinders in the bin with axis aligned and parallel. The techniques for manufacturing cylinders of the required type are already well known in the can making arts. Furthermore, cylinders can be inexpensively produced from highly desireable materials such as aluminum and the task of filling and permanently sealing these cylinders is perfected. Also, various protective coatings and techniques for their application have been developed to protect the aluminum from chemical interaction with heat storage media within the cylinder.

FIG. 5 shows a sample installation of the reservoirs 10 in a bin 12 connected to a hot air solar heating system. Plenum 40 provides an air intake with branch 41 leading from the solar collector and branch 42 leading from a dwelling house heating system. Valve 43 may be selectively operated to open either or both branches to the plenum 40. A single filter 44 is adequate in this system because of the predictable air flow characteristics of the stack of reservoirs and the greater cleanliness of the reservoirs as compared to rock bed storage. A single fan 45 and motor 46 drive the air through the bin and through the appropriate plenum. At the outlet end of bin 12 is plenum 50 that leads to branch 51 returning air to the solar collector and branch 52 carrying air to the dwelling house heating system. Valve 53 again selectively opens either or both branches to plenum 50.

Maximum solar collector efficiency is obtained when the fluid received by the collector from the storage bin 12 is at the coolest possible temperature. The heat reservoirs 10 should therefore act as independent heat exchangers to provide good temperature stratification in the bin 12, with the highest temperatures being near the fluid inlet and the lowest temperatures being near the fluid outlet. When the reservoirs are spheres having plastic shells, temperature stratification is at a maximum because the plastic does not tend to conduct heat between shells as readily as will aluminum or similar metals. Furthermore, heat conductivity enhancers in the shells will enhance the heat transfer from heated fluid to the contained phase change medium in the shells. The spheres will contact neighboring spheres only at a single point, both reducing direct conduction of heat between spheres and exposing a maximum of the shell surface area to the solar heated fluid. If metal cylinders are used in place of plastic spheres, insulation means must be used between the cylinders to optimize temperature stratification in the bin. The insulation means may be any physical object placed between adjacent cans, including a localized coating, tape, or plastic ring or band around each can.

The thermal storage system has been described with respect to a solar heating unit; however, it should be understood that the system is suited for use with many other types of heating or cooling devices. For example, the system may be used for night radiation cooling or with a heat pump. With electrical resistance heating, the system could be warmed during off-peak electrical demand hours. A microwave heater could heat the all plastic storage system very efficiently.

Figure 8:
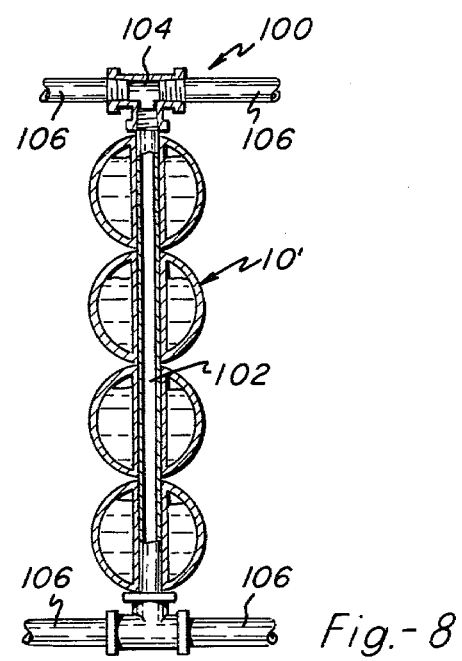
FIG. 8 is a cross-sectional view taken along the line 8—8 of FIG. 7.

A further embodiment of the invention is shown in FIGS. 7 and 8 to include a carrying means 100 upon which one or more spheres 10' having central passageway 28 are carried. The carrying means serves to organize the sphere-like reservoirs into a desired configuration such as a row or column, although other configurations may equally as well be achieved through proper interconnection of the carrying means. Specifically, an elongated member such as hollow pipe 102 may be employed to string together a plurality of the reservoirs. Vertical orientation of the pipe causes the reservoirs to be gravity directed into abuttment between adjacent reservoirs for heat transfer at the contact point. Horizontal orientation of the pipe is also possible and permits the reservoirs to be relatively located with any desired inter-reservoir spacing.

By conventional interconnection of pipes, the carrying means may include an array containing a plurality of parallel pipes 102 connected at their ends by couplings 104, which may be T couplings, and then interconnected by perpendicular cross pipes 106. The pipes themselves may serve as a heat distributing elements acting through the wall of passageway 28, and in addition the pipes may contain a fluid being moved through the pipe array, such as by pump or gravity. Thus, the product of a solar heat exchanger, heat pump, or boiler can be entirely or partially directed through the pipes of carrying means 100 for repeated or one time transmission of heat to or from the reservoirs.

Figure 9:
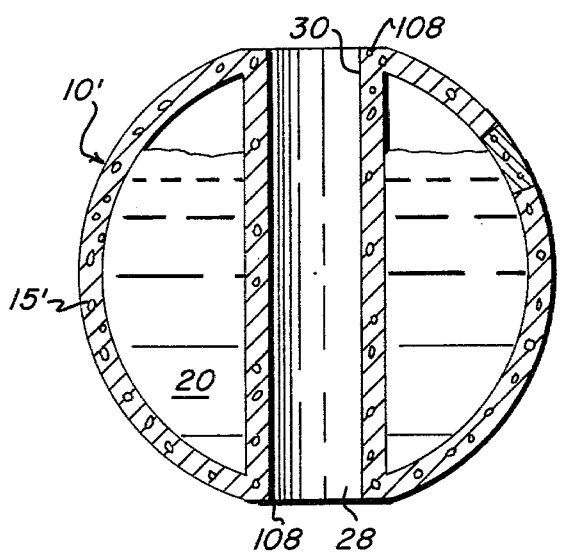
FIG. 9 is an enlarged diametric cross-sectional view of reservoirs stacked in a column taken through the axis of the central passageway.

A mechanically organized array of reservoirs on fluid transmitting conduits such as pipes 102 is created by stringing the reservoirs of the pipes 102 before placing a suitable coupling over at least one end of the pipe. To protect the reservoirs against damage during stringing, the wall 30 of each passageway may have a truncated end 108, FIG. 9, forming a flat annular rim at each end of passageway 28, with the radial width of the rim being approximately the thickness of wall 30. The weight of a column of reservoirs is thereby spread over a flat area better able to bear the column loading when a substantial number of the reservoirs are in a single column. The possibility of chipping and cracking reservoirs shells during assembly of an array is thus reduced. During assembly of reservoirs in a naturally sorted array such as that shown in FIG. 5, structural damage to the shells is less likely because each reservoir is supported by a plurality of others in direct contact and impact between adjacent reservoirs is not commonly received along a diameter of the sphere-like shape. For this reason, the truncated ends of the sphere are not necessary in earlier embodiments.

Figure 10:
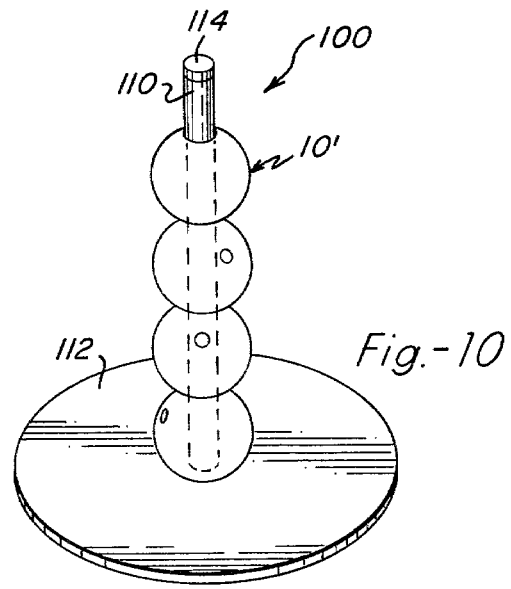
FIG. 10 is a perspective view of a plurality of reservoirs on a modified carrying member.

The carrying means may serve its organizational function with or without capacity to transmit heat from a contained fluid in the embodiment of FIG. 10, where a plurality of spheres 10' are engaged over a rod 110 having no internal fluid transmitting capability. One end of the rod may be engaged in a base 112 capable of supporting the rod at any desired angular position. The opposite end of the rod may terminate without attachment to any other object, or a retaining cap 114 may be installed thereon, as by a friction fit, to prevent accidental removal of spheres.

Rod 110 or pipe 102 may be constructed from any material having the necessary strength to carry the load of the reservoirs. Plastics or metals are suitable, and the carrying member may also be flexible such as flexible plastic or metal tubing. The embodiment of FIG. 10 also offers the possibility of transferring heat by conduction through the material of the rod 110, which may be metal or a plastic containing heat conductivity enhancers. Copper tubing is presently preferred as the material for pipe 102 for its combination of strength and heat conductivity, as well as its stability to carry hot water, steam, and other fluids that are suited for use in heat collectors and radiators. The rod 110 may be an electric heating element.

The best anticipated application of carrying means 100 with reservoirs 10' carried thereon is in combination with a storage bin 12, FIG. 5, used to store and deliver heating or cooling energy from a primary source such as a solar collector or heat pump. Carrying means 100 are employed at one or more locations within the storage bin to carry some or all of the reservoirs contained therein. The storage bin 12 receives a circulating fluid associated with the primary heating or cooling system for transferring heat between the reservoirs and a point of use. If the primary source should fail to supply an adequate quantity of heating or cooling energy to the reservoirs, the average reservoir temperature is adjusted by means of a stand-by or secondary energy source, such as steam heat, hot water, hot air, or electrical heating elements acting through the carrying means to supply the desired energy to the carried reservoirs.

In a specific example, wherein the storage bin is warmed by hot air from a solar collector, twenty percent of the reservoirs in the storage bin may be mounted on electric heating element rods. If the solar collector fails to supply adequate heat, as during a period of cloudy weather, the electric heating elements may be activated to replenish the stored heat in the storage bin. Replenishment may take place during periods of low electrical load for best economy of resources, and the heat so added to the system may then be conveyed to the point of use whenever needed. The major components of the primary heating system such as the plenum and fan are thus employed by both primary and secondary heating purposes.

Temperature stratification within storage bin 12 may be maintained when the secondary energy source is in use by locating the carrying means and associated reservoirs near the bin inlet. When the bin is being initially filled, the carrying means 100 are first installed in the empty bin and the associated reservoirs are placed on the elongated rods or pipes. The remainder of the bin is then filled by bulk loading of loose reservoirs, which are self-arranging into an array of predictable air flow characteristics.

In certain applications, the use of heat distributing elements in the diametric passageway of the reservoirs may be preferred as the primary way of supplying energy to the storage bin, and the passage of warmed air about the spherical outer surface of the reservoir shell from a solar source may be the supplemental energy source. In this situation, it may be preferred to mount substantially more than twenty percent of the reservoirs on such elongated distributing elements. In this way, the reservoirs permit heat to be gathered during non-peak fuel demand periods and permit the heat to be supplemented by other sources as they are available.

Cooling systems may employ the invention equally as well.

Figure 11:
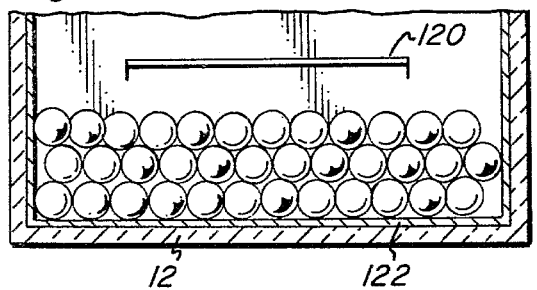
FIG. 11 is a fragmentary cross-sectional view of a storage bin containing reservoirs and a microwave heating element.

Microwave heating elements 120, FIG. 11, may be used to heat the plastic storage system efficiently. A microwave heating element 120 is located inside the bin, for example near one end, and radiates microwave energy through all of the spheres. The inner surface 122 of the insulated bin wall of the storage system is lined with a radiation reflecting material such as aluminum foil to reflect the microwave energy and increase heating efficiency.

I claim:

1. A thermal storage system for use with a circulating fluid that is passed through the thermal storage system for exchange of energy between the fluid and the system, wherein the system comprises:
    (a) a storage bin having means associated therewith for, in use, receiving and discharging the circulating fluid;
    (b) a plurality of discrete heat storage reservoirs within said bin, each having a shell of regular sphere-like geometric shape defining an interior cavity within the reservoir and defining a substantially diametric passageway through the sphere-like shell;
    (c) an elongated carrying member in said bin having a plurality of said reservoirs engaged thereon through said passageway; and
    (d) heat storage media contained within said cavity, the shell conducting heat between the fluid and the heat storage media.

2. The thermal storage system of claim 1, wherein said elongated carrying member comprises a hollow conduit adapted to carry a fluid there through for heat transfer with the reservoirs carried on said member.

3. The thermal storage system of claim 1, wherein said elongated member comprises an electrical heating element.

4. The thermal storage system of claim 1, wherein said fluid receiving means and discharging means are separately located with respect to each other and said carrying member is located relatively closer to the receiving means.

5. The thermal storage system of claim 1, wherein at least said reservoirs engaged on the carrying member comprise a flat annular rim at each end of said passageway.

6. The thermal storage system of claim 1, wherein said reservoirs are of the type comprising a heat conductive shell of plastic having non-plastic heat conductivity enhancers therein throughout the thickness of the shell.

7. The thermal storage system of claim 1, further comprising microwave generating means in said storage bin for warming said heat storage media.

8. The thermal storage system of claim 7, wherein said storage bin further comprises a lining wall of microwave radiation reflective material.

9. The thermal storage system of claim 8, wherein said lining wall comprises aluminum sheet material.

10. The thermal storage system of claim 7, wherein said reservoirs comprise a shell substantially of synthetic plastic material.

* * * * *